United States Patent [19]
Kato et al.

[11] 4,435,536
[45] Mar. 6, 1984

[54] ONE-PACK COMPOSITION

[75] Inventors: Yasushi Kato; Hisao Furukawa, both of Kobe, Japan

[73] Assignee: Kanegafuchi Kagaku Kogyo Kabushiki Kaisha, Osaka, Japan

[21] Appl. No.: 360,274

[22] Filed: Mar. 22, 1982

[30] Foreign Application Priority Data

Apr. 17, 1981 [JP] Japan .................................. 56-59002

[51] Int. Cl.³ ............................ C08K 5/07; C08K 5/05
[52] U.S. Cl. .................................... 524/378; 524/379; 525/326.5; 525/342; 525/370
[58] Field of Search .............................. 524/378, 379; 525/326.5, 370, 342

[56] References Cited

U.S. PATENT DOCUMENTS 4,043,953 8/1977 Chang et al. ..................... 525/342
4,157,321 6/1979 Kawakami et al. ................ 524/378

Primary Examiner—Joseph L. Schofer
Assistant Examiner—Bernard Lipman
Attorney, Agent, or Firm—Moonray Kojima

[57] ABSTRACT

A one-pack type of curable composition comprising a blend consisting essentially of a silyl group containing resin having a backbone substantially comprising a vinyl type polymer chain and containing at least one silicon atom attached to a hydrolyzable group at a terminal or in a side chain of its molecule, a curing catalyst, and a solvent. This composition has excellent storage stability, excellent workability, excellent weather resistance, and excellent weather resistance after coating and curing, and high hardness of the coated surface after curing.

3 Claims, No Drawings

ONE-PACK COMPOSITION

BACKGROUND OF THE INVENTION

1. Field of the Invention

This invention relates to compositions which are curable by exposure to ambient moisture, and more particularly to such compositions which comprise a blend of a silyl group containing resin and a curing catalyst.

2. Description of the Prior Art

There are known in the prior art various silicon compounds containing a silicon atom attached to a hydrolyzable group. These compounds have good adhesion to inorganic substances because of the action of their hydrolyzable silyl group. Also, there is cross linking at ambient temperatures upon exposure to moisture, especially atmospheric moisture to form cured products having excellent durability. These compounds are thus extensively employed as paints, coating agents, adhesives, sealants, silane coupling agents, and the like.

However, when these silicon compounds containing a silicon atom attached to a hydrolyzable group are used without a curing catalyst, they are slow in curing speed at room temperature, or at a relatively moderately elevated temperature. Thus, when a coating of such compound is required to be cured at a high rate, a high degree of heating at a high temperature is required. Accordingly, in such an instance, an enormous amount of energy is needed.

To cure this deficiency, it has been suggested to use a curing catalyst incorporated into the curable composition, immediately prior to use, to thereby enhance the curing speed of the coating at a relatively low temperature. However, disadvantageously, once a curing catalyst is added to such a composition, it cannot be stored for any length of time because the composition will cure in a short length of time. Thus, when a part of the composition, such as for example a paint composed of such composition, has been used, the unused remainder is essentially wasted. Such curable compositions are generally called a two-pack type of curable composition.

On the other hand, a curable composition may include therein a curable catalyst, in which case, no other composition or catalyst need be added immediately prior to use. This type of curable composition is called a one-pack type of curable composition. One known as a one-pack type of composition comprises a blend of a curing catalyst and a silicon compound having a backbone of hydrolyzable silyl group and having siloxane bonds. This prior one-pack type of composition has been found to have some deficiencies, such as non-optimal hardness after during, insufficiently good storage stability, only average workability and weather resistance.

Accordingly, there is still a need in the prior art for a one-pack type of curable composition which has excellent storage stability, high hardness of the cured surface, excellent workability and weather resistance.

SUMMARY OF THE INVENTION

Accordingly, an object of the invention is to overcome the aforementioned and other deficiencies and disadvantages of the prior art.

Another object is to provide a one-pack type of curable composition which is curable at high speeds without application of large amounts of heat at high temperatures, and has excellent storage stability, and when cured has excellent hardness of the surface so obtained, and further has excellent workability and weather resistance.

The foregoing and other objects and features of the invention are attained in this invention which encompasses a mixture or homogeneous blend consisting essentially of (A) a silyl group containing resin having a backbone substantially comprising a vinyl type polymer chain and containing a silicon atom attached to a hydrolyzable group in a side chain or at the terminal of its molecule, (B) a curing catalyst, and (C) a solvent. Advantageously, the inventive composition has excellent workability during its application, excellent weather resistance, and excellent weather resistance after coating and curing, and excellent hardness of the resulting coating, obtained after curing by exposure to the ambient moisture.

DETAILED DESCRIPTION OF PREFERRED EMBODIMENTS

The resin used in this invention has a backbone which substantially comprises a vinyl type polymer chain and contains at least one, and preferably 2 or more, silyl groups attached to hydrolyzable groups at the terminals or in side chains in its molecules. Most of the silyl groups used herein are represented the formula:

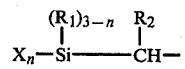

wherein X is a hydrolyzable group, $R_1$ and $R_2$ are each hydrogen or any alkyl group, aryl group or aralkyl group having 1 to 10 carbon atoms, and n is an integer of 1,2 or 3.

Examples of the hydrolyzable group include halogen, alkoxy, acyloxy, ketoxymate, amino, acid amido, aminoxy, mercapto, alkenyloxy groups, and the like.

Production of the silyl group containing vinyl type resin according to the invention, may be effected in various ways. For example, one process, herein called process (i), involves hydrosilylation reaction using a vinyl type resin having a carbon-carbon double bond and a hydrosilane. Another process (called process (ii)) involves a copolymerization of a vinyl type compound and a silyl compound having a polymerizable double bond. These processes are advantageous from an industrial standpoint, and will be described in further detail below:

Process (i)

The silyl group containing vinyl type resin of this invention may be easily produced by reaction of a hydrosilane compound with a vinyl type resin having a carbon-carbon double bond, in the presence of a catalyst of a Group VIII transition metal. The hydrosilane compound used in this invention has the following general formula:

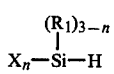

wherein $R_1$ is hydrogen, or a monovalent hydrocarbon group selected from the group consisting of an alkyl group, an aryl group and an aralkyl group having 1 to 10 carbon atoms; X is a hydrolyzable group and n is an integer of 1, 2, or 3.

Specific examples of hydrosilane compounds within this general formula include halogenated silanes, such as, methyldichlorosilane, trichlorosilane, phenyldichlorosilane, etc; alkoxysilanes, such as, methyldiethoxysilane, methyldimethoxysilane, phenyldimethoxysilane, trimethoxysilane, triethyoxysilane, etc; acyloxysilanes, such as, methyldiacetoxysilane, phenyldiacetoxysilane, triacetoxysilane, etc; and other various silanes, such as methyldiaminoxysilane, triaminoxysilane, methyldiaminosilane, triaminosilane, bis(dimethylketoxymate)methylsilane, bis(cyclohexylketoxymate)methylsilane, methyldiisopropenoxysilane, triisopropenoxysilane, etc.

The amount of hydrosilane compound used, can be any suitable amount, but, is preferably from 0.5 to 2 moles per carbon-carbon double bond, contained in the vinyl type resin. Although use of hydrosilane compound in an amount above this range is not excluded, no substantial benefit is obtained thereby. The added amount will usually remain unreacted and may be recovered for reuse.

Furthermore, a highly reactive halogenated silane, which is an inexpensive basic starting material, may easily be employed as the hydrosilane compound used in this invention. The silyl group containing vinyl type resin, obtained by using a halogenated silane, when exposed to moisture in the ambient atmosphere, rapidly cures at the ambient temperature, and, disadvantageously, emits hydrogen chloride. This results in such problems as generation of pungent odor, due to the hydrogen chloride, and corrosion of substances in contact with the resin or adjacent to the resin. Hence, this resin can only be employed in a limited number of practical applications. Thus, it is desirable to subsequently further convert the halogen function group to other hydrolyzable functional groups. For example, it may be converted to alkoxy, acryloxy, aminoxy, amido, acid amido, ketoxymate, mercapto and the like groups. One method of such conversion is disclosed, for example, in Japanese Laid-Open Patent Application No. 91546/1979.

The vinyl type resin used in process (i), in this invention is not particularly limited, except that the vinyl type resin containing hydroxyl groups are excluded. A resin comprising, as the main component, a homopolymer or a copolymer selected from the following is suitable: acrylic acid or methacrylic acid esters, such as, methyl acrylate, methyl methacrylate, ethyl acrylate, ethyl methacrylate, butyl acrylate, butyl methacrylate, 2-ethylhexyl acrylate, 2-ethylhexyl methacrylate, etc; carboxylic acids, such as, acrylic acid, methacrylic acid, itaconic acid fumaric acid, etc; acid anhydrides, such as, maleic anhydride, etc; epoxy compounds, such as, glycidyl acrylate, glycidyl methacrylate, etc; amino compounds, such as, diethylaminoethyl acrylate, diethylaminoethyl methacrylate, aminoethyl vinyl ether, etc; amide compounds, such as, acrylamide, methacrylamide, itaconic acid diamide, alpha ethylacrylamide, crotonamide, fumaric acid diamide, maleic acid diamide, N-butoxymethylacrylamide, N-butoxymethylmethacrylamide, etc; acrylonitrile; iminol methacrylate; styrene; alpha methylstyrene; vinyl chloride; vinyl acetate; vinyl propionate; etc. On producing a homopolymer or copolymer of these vinyl compounds, allyl acrylate, allyl methacrylate, diallyl phthalate or the like, may be partially radical copolymerized therewith to incorporate a carbon-carbon double bond into the vinyl type resin at the molecular terminal or in a side chain of the molecule, for the hydrosilyation reaction. The amount of monomer necessary for this can be determined depending on the number of silyl groups in the desired resin. Furthermore, the molecular weight may be modified by adding a chain transfer agent, such as n-dodecylmercaptan, t-dodecylmercaptan, etc. Polymerization of these vinyl compounds may be conducted either using or not using a solvent. If a solvent is used, a non-reactive solvent is preferred, such as an ether, hydrocarbon, acetic acid ester, etc.

In this invention, a catalyst of a transition metal complex is used in the stage of reacting the hydrosilane compound with the carbon-carbon double bond. Effectively employed as the transition metal complex catalyst, is a complex of a Group VIII transition metal selected from platinum, rhodium, cobalt, palladium and nickel. This hydrosilyation reaction may be effected at any temperature of from 50° C. to 150° C., and the reaction time may be about from 1 to 10 hours.

Process (ii)

The other process used in the invention, comprises radical polymerization of various vinyl type compounds with silane compound of the formula:

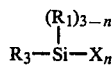

wherein $R_1$ is a monovalent hydrocarbon group selected from an alkyl group, an aryl group and an aralkyl group having 1 to 10 carbon atoms, $R_3$ is an organic residue containing a polymerizable double bond, X is a hydrolyzable group, and n is an integer 1, 2 or 3.

Examples of the silane compounds used in this invention include:

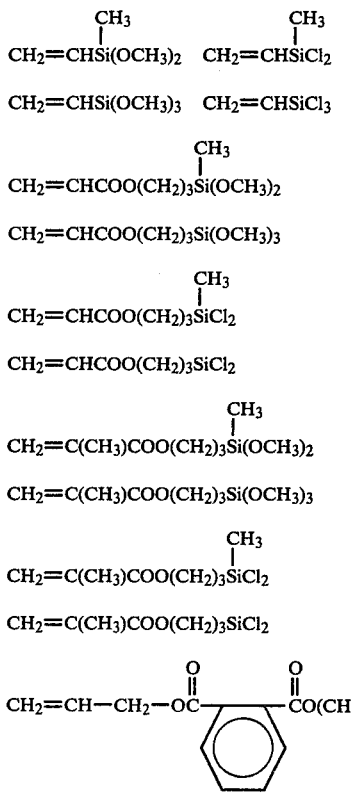

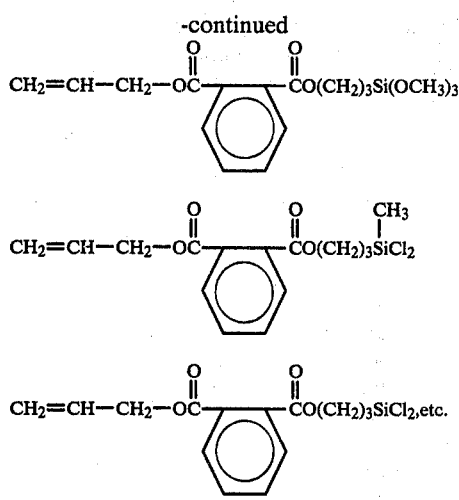

These silane compounds may be synthesized in various manners. For example, they may be produced by reacting acetylene, allyl acrylate, allyl methacrylate or diallyl phthalate with methyldimethoxysilane, methyldichlorosilane, trimethoxysilane or trichlorosilane, in the presence of a catalyst of a Group VIII transition metal.

While the compounds used for the synthesis of the vinyl type resin in the above process (i) may be used as a vinyl type compound used in process (ii), there may also be employed vinyl type compounds containing a hydroxyl group, such as, 2-hydroxyethyl acrylate, 2-hydroxyethyl methacrylate, 2-hydroxypropyl acrylate, 2-hydroxypropyl methacrylate, 2-hydroxyvinyl ether, N-methylol acrylamide, ARONIX 5700 (produced by Toa Gosei Chemical Company, Inc.), and the like.

The synthesis of a copolymer of such vinyl type compounds and silane compounds may be carried out by a conventional solution polymerization method. The vinyl type compound, the silane compound, a radicalinitiator, and a chain transfer agent, such as n-dodecylmercaptan, t-dodecylmercaptan, and the like, selected according to the molecular weight desired in the produced silyl group containing resin, are added and reacted at a temperature of from 50° C. to 150° C. A solvent may be optionally used. If a solvent is used, a non-reactive solvent is referred, such as for example, an ether, a hydrocarbon, an acetic acid ester, and the like.

The silyl group containing vinyl type resin, thus obtained, may be subjected to, for example, a method for displacing the hydrolyzable group, such as disclosed in Japanese Laid-Open Patent Application No. 91546/1979.

Thus, there is obtained a silyl group containing vinyl type resin in which the backbone substantially comprises a vinyl type polymer chain and contains at least one silicon atom attached to a hydrolyzable group at a terminal or in a side chain of its molecule.

Although the molecular weight of the silyl group containing vinyl type resin used in this invention is not particularly restricted, it is preferred that the molecular weight be in the range of from 1,000 to 30,000, in view of stability and physical properties desired of the cured product. Furthermore, it is possible to improve the adhesion of the silyl group containing vinyl type resin by incorporating the above discussed ethylenically unsaturated organic monomer or monomers, containing active hydrogen such as a carboxyl group, a hydroxyl group, an amino group, an amido group, and the like, as a copolymerization component.

The curing catalyst used in this invention may be selected from compounds generally used as curing catalyst for hydrolyzable silyl group containing resins. For example, one or more of the following may be employed: alkyl titanic acid salts; acidic compounds, such as, phosphoric acid, p-toluenesulfonic acid, phtalic acid, and the like; amine compounds, such as, aliphatic diamines such as ethylenediamine, hexanediamine, etc; aliphatic polyamines, such as, diethylenetriamine, triethylenetetramine, tetraethylenepentamine, etc; alicyclic amines, such as, piperidine, piperazine, etc; aromatic amines, such as, metaphenylenediamine, etc; ethanolamines; triethylamine; and various modified amines, such as used as curing agents for epoxy resins; organic tin compounds, such as, carboxylic acid organic tin compounds, such as $(n{-}C_4H_9)_2Sn(OCOC_{11}H_{23}{-}n)_2$ $(n{-}C_4H_9)_2Sn(OCOCH{=}CHCOOCH_3)_2$ $(n{-}C_4H_9)_2Sn(OCOCH{=}CHCOOC_4H_9{-}n)_2$ $(n{-}C_8H_{17})_2Sn(OCOC_{11}H_{23}{-}n)_2$ $(n{-}C_8H_{17})_2Sn(OCOCH{=}CHCOOCH_3)_2$ $(n{-}C_8H_{17})_2Sn(OCOCH{=}CHCOOC_4H{-}n)_2$ $(n{-}C_8H_{17})_2Sn(OCOCH{=}CHCOOC_8H_{17}{-}iso)_2$ $Sn(OCOC_8H_{17}{-}n)_2$, etc;

mercaptide type organic tin compounds, such as, $(n{-}C_4H_9)_2Sn(SCH_2COO)$ $(n{-}C_4H_9)_2Sn(SCH_2COOC_8H_{17}{-}iso)_2$ $(n{-}C_8H_{17})_2Sn(SCH_2COO)$ $(n{-}C_8H_{17})_2Sn(SCH_2CH_2COO)$ $(n{-}C_8H_{17})_2Sn(SCH_2COOCH_2CH_2OCOCH_2S)$ $(n{-}C_8H_{17})_2Sn(SCH_2COOCH_2CH_2CH_2CH_2OCOH_2S)$ $(n{-}C_8H_{17})_2Sn(SCH_2COOC_8H_{17}{-}iso)_2$ $(n{-}C_8H_{17})_2Sn(SCH_2COOC_{12}H_{25}{-}n)_2$

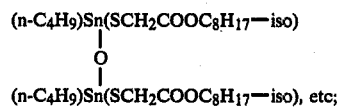

sulfide type organic tin compounds, such as,

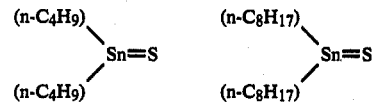

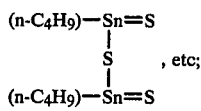

organic tin oxides, such as, (n—$C_4H_9)_2SnO$, (n—$C_8H_{17}$)SnO, etc; reaction products of organic tin oxides, such as, (n—$C_4H_9$)SnO, (n—$C_8H_{17}$)SnO, etc, with ester compounds, su such as, ethyl silicate, ethyl silicate 40, dimethyl maleate, diethyl maleate, dioctyl maleate, dimethyl phthalate, diethyl phthalate, dioctyl phthalate, etc; and the like.

The curing catalyst may be used in an amount of preferably 0.01 to 10 parts by weight, and more preferably 0.1 to 8 parts by weight, per 100 parts by weight of the silyl group containing vinyl type resin.

The solvent used in this invention may be a solvent which can dissolve both the silyl group containing vinyl type resin, and the curing catalyst; or a solvent, which, although not dissolving both, can be mixed with one or more other solvents, and does not cause any precipitate when bringing the two liquids into association. For example, there may be used, those solvents used in conventional paints, coatings, etc, such as aliphatic hydrocarbons, aromatic hydrocarbons, alcohols, ketones, esters, ethers, alcohol esters, ketone alcohols, ether alcohols, ketone ethers, ketone esters, ester ethers, and the like. Furthermore, when these solvents contain an alkyl alcohol and/or a hydrolyzable ester, the storage stability of the one composition of this invention will be especially enhanced.

As the alkyl alcohol usable in the invention in the solvent, an alcohol having 1 to 10 carbon atoms in the alkyl, is preferred. Also, there may be used, one or more of the following: methyl alcohol, ethyl alcohol, n-propyl alcohol, isopropyl alcohol, n-butyl alcohol, isobutyl alcohol, sec-butyl alcohol, tert-butyl alcohol, n-amyl alcohol, isoamyl alcohol, hexyl alcohol, octyl alcohol, cellosolve, and the like.

As the hydrolyzable ester usable in the invention in the solvent, one or more of the following may be used: trialkyl orthoformates, such as trimethyl orthoformate, triethyl orthoformate, triporopyl orthoformate, tributyl orthoformate, etc; tetraalkyl orthosilicates, such as, tetramethyl orthosilicate, tetraethyl orthosilicate, tetrapropyl orthosilicate, tetrabutyl orthosilicate, etc; and hydrolyzable organic silicon compounds having the formula:

wherein X is a hydrolyzable group, R is a monovalent organic group optionally containing a functional group, and n is an integer of 1,2,3, or 4, preferably 3 or 4, such as, ethyl silicate 40, methyltrimethoxysilane, methyltriethoxysilane, ethyltrimethoxysilane, ethyltriethoxysilane, phenyltrimethoxysilane, phenyltriethoxysilane, vinyltrimethoxysilane, vinyltriethoxysilane, γ-methacryloxyproppyltrimethoxysilane, γ-mercaptopropyltrimethoxysilane, etc; and partial hydrolyzates thereof.

The amount of solvent may vary, depending on the molecular weight or on the composition of the silyl group containing vinyl type resin. The amount of solvent is employed according to the solids concentration or viscosity required in actual use. The solvents above listed and the like may be used singly or in a mixture of two or more. Similarly, with the curing catalysts, they may be used singly or in a mixture of two or more.

In addition, it is also possible to enhance the adhesion of the composition to for example, an inorganic surface upon curing, by adding a compound to the inventive composition blend, a compound having at least one silicon atom attached to a hydrolyzable group in the molecule, such as a silane coupling agent or a reaction product thereof.

Since one pack compositions of this invention can cure at ambient temperatures, or lower temperatures, and the cured products have excellent properties, such as excellent adhesion, weather resistance, hardness, etc, they are useful as paints, coatings, coating agents, primers, adhesives, sealants, etc, for various surfaces, such as inorganic surfaces (e.g. iron plates, tin plates, galvanized plates, aluminum plates, zinc steel platess, tiles, slates, etc) and organic surfaces (e.g. wood, paper, cellophane, plastic, organic paint coatings, etc). Since the inventive composition is capable of being cured at low temperatures, it may be used as paints for protecting against corrosion, such as on bridges, face coatings, as paints for repairing automobiles, as paints for organic substance surfaces, and the like.

Furthermore, the invention maybe further blended with various resins currently employed as paints, coating agents, primers, adhesives, etc. For example, the inventive compositions may be mixed in appropriate proportions with lacquer type paints, acryl lacquer type paints, thermosetting acrylic paints, alkyd paints, melamine paints, epoxy type paints, etc, and can improve physical properties, such as adhesion, weather resistance, etc, of these other paints, coatings, etc.

The invention will now be more particularly described with reference to actual examples, which examples are illustrative of the principles of the invention and are not to be construed to be limiting of the invention.

Preparation of the Silyl Group Containing Vinyl Resin

EXAMPLE 1

A solution of 2 g of azobisisobutylonitrile in 30 g of styrene, 16 g of allyl methacrylate, 20 g of methyl methacrylate, 19 g of n-butyl methacrylate, 14 g of butyl acrylate, 4 g of maleic anhydride and 2 g of n-dodecylmercaptan was added dropwise to 90 g of a xylene solvent, heated to 90° C., and the mixture was reacted for 10 hours to obtain a vinyl type copolymer containing allyl type unsaturated groups and having a molecular weight of 8,000. The molecular weight was measured by ordinary method, such as the GPC method (gel permeation column method), as in the other examples. The infrared spectrum of this product showed an absorption of the carbon-carbon double bond at 1648 $cm^{-1}$ and an absorption of the acid anhydride at 1780 $cm^{-1}$. The resultant polymer solution was distilled under reduced pressure to remove 40 g of the solvent.

To 16 g of the obtained solution of the vinyl copolymer containing allyl type unsaturated groups, was added a solution of 1.5 g of methyldimethoxysilane and 0.0005 g of chloroplatinic acid, in isopropanol. Reaction of the mixture was effected, under sealed conditions, at 90° C. for 6 hours. In the infrared spectrum of this product, absorption at 1648 $cm^{-1}$ was found not to exist. Thus, a silyl group containing vinyl type resin was obtained.

EXAMPLE 2

A solution of 2 g of azobisisobutylonitrile in 30 g of styrene, 22 g of 65-methacryloxypropyltrimethoxysilane, 22 g of methyl methacrylate, 15 g of n-butyl methacrylate, 18 g of butylacrylate, was added dropwise to 70 g of xylene heated to 120° C., and the resulting mixture was reacted for 10 hours to obtain a silyl group containing vinyl type resin having a molecular weight of 12,000.

EXAMPLE 3

A solution of 2 g of azobisisobutylonitrile in 30 g of styrene, 22 g of γ-methacryloxypropyltrimethoxysilane, 22 g of methyl methacrylate, 15 g of n-butyl methacrylate, 18 g of butyl acrylate, 4 g of acrylamide, 10 g of n-butanol and 2 g of n-dodecylmercaptan, was added dropwise to 70 g of xylene, heated to 90° C., and the resulting mixture was reacted for 10 hours to obtain a silyl group containing vinyl type resin having a molecular weight of 8,000.

EXAMPLE 4

A solution of 2 g of azobisisobutylonitrile in 30 g of styrene, 22 g of γ-methacryloxypropyltrimethoxysilane, 22 g of methyl methacrylate, 13 g of n-butyl methacrylate, 18 g of butyl acrylate, 2 g of 2-hydroxypropylmethacrylate, 10 g of n-butanol and 4 g of n-dodecylmercaptan was added dropwise to 70 g of xylene heated to 90° C., and the mixture was reacted for 10 hours to obtain a silyl group containing vinyl type resin, and having a molecular weight of 6,000.

Preparation of Blend of Resin, Catalyst and Solvent

To each of resin solutions obtained in Examples, 1,2,3,4 described above, there were added, respectively, curing catalyst(s) and solvent(s) and other additives where indicated, as set forth in the following Table 1. Each mixture was then diluted with n-butyl acetate to the solid concentratio (% by weight) indicated in Table 1.

Then the resulting mixture was blended using an ordinary blender until substantially homogeneous, and then sealed in a tin paint can, and stored at 50° C. for 20 days. After storage, changes in solution viscosity of the blends were examined. The results of such changes are shown in Table 1. Each of the above one-pack blends was coated on a soft steel plate, and cured by heating at 60° C. for 30 minutes, to produce a coating on the surfaces of soft steel plate. After 5 days, the pencil hardness of the coatings were measured, and the results thereof are shown in the Table 1.

As described, it can be seen that the one-pack compositions of this invention, have excellent storage stability, and at the same time, the coatings produced after curing at low temperatures, produce excellent hardness of coating.

The foregoing description is illustrative of the principles of the invention. Numerous modifications and extensions thereof would be apparent to the worker skilled in the art. All such modifications and extensions are to be considered to be within the spirit and scope of the invention.

What is claimed is:

1. A one-pack curable composition comprising a mixture consisting essentially of (A) 100 parts by weight of a silyl group containing resin having a backbone substantially comprising a vinyl polymer chain and containing at least one silicon atom attached to a hydrolyzable group at a terminal or in a side chain of its molecule; (B) 0.1 to 10 parts by weight of a curing catalyst; and (C) a solvent;

wherein said curing catalyst is selected from the group consisting of a carboxylic acid type organic tin compound, a mercaptide type organic tin compound having a Sn-S bond, and a sulfide type organic tin compound having a Sn=S bond;

wherein said solvent comprises hydrolyzable ester and/or alkyl alcohol; and wherein said silyl group containing resin has a molecular weight of between 1,000 and 30,000 and contains an ethylenically unsaturated organic monomer containing active hydrogen as a copolymerization component.

2. The composition of claim 1, wherein said hydrolyzable group is an alkoxy group.

TABLE 1

| Ex. | Curing Catalyst*4 | Solvent and/or Additive*5 | Solids Concentration | Solution Viscosity Initial | Solution Viscosity after 20 days (50° C.) | Pencil Hardness |
|---|---|---|---|---|---|---|
| 1 | Q631*1 (3) | methanol (10) | 45 | 180 | 195 | F |
| 2 | Stann JF-98*2 (3) | methanol (10), Ethyl silicate (5), methyl orthoformate (5) | 42 | 100 | 200 | 2H |
| 3 | Tetraethylenepentamine (3) | methanol (5), methyl orthoformate (3) | 50 | 180 | 290 | F |
| 3 | Stann OM*3 (2) | | 50 | 185 | 400 | H |
|   | Stann OM (2) | methanol (10) | 50 | 100 | 270 | H |
|   | Stann OM (2) | ethyl silicate (5) | 50 | 200 | 350 | H |
|   | Stann OM (2) | methanol (10), methyl orthoformate (2) | 50 | 110 | 200 | H |
| 4 | p-toluenesulfonic acid (1) | methyl orthoformate (2) | 55 | 120 | 140 | 2H |
|   | Dibutyltin dilaurate (3) | | 55 | 200 | 300 | 2H |
|   | Dibutyltin dilaurate (2) | methyltrimethoxysilane (5) | 55 | 200 | 250 | 2H |

NOTES
*1 = epoxy resin curing catalyst produced by Mitsui Petrochemical Epoxy Co, Ltd.
*2 = stabilizer for vinyl chloride polymers (mercaptide type tin compound) produced by Sankyo Organic Chemical Co, Ltd.
*3 = trade name for a stabilizer for vinyl chloride polymers (carboxylic acid type tin compound) produced by Sankyo Organic Chemical Co, Ltd.
*4,*5 = Units parts by weight per 100 parts by weight of the resin solids in the example.

3. The composition of claim 1, wherein said curing catalyst is used in an amount of from 0.1 to 8 parts by weight.

* * * * *